(12) United States Patent
Shi et al.

(10) Patent No.: US 11,985,439 B2
(45) Date of Patent: May 14, 2024

(54) CONE-ROD DUAL-MODALITY NEUROMORPHIC VISION SENSOR

(71) Applicant: TSINGHUA UNIVERSITY, Beijing (CN)

(72) Inventors: Luping Shi, Beijing (CN); Zheyu Yang, Beijing (CN); Rong Zhao, Beijing (CN); Jing Pei, Beijing (CN); Haizheng Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 140 days.

(21) Appl. No.: 17/788,889

(22) PCT Filed: Jan. 21, 2020

(86) PCT No.: PCT/CN2020/073505
§ 371 (c)(1),
(2) Date: Jun. 24, 2022

(87) PCT Pub. No.: WO2021/128531
PCT Pub. Date: Jul. 1, 2021

(65) Prior Publication Data
US 2023/0050794 A1  Feb. 16, 2023

(30) Foreign Application Priority Data
Dec. 24, 2019 (CN) .......................... 201911350683.2

(51) Int. Cl.
*H04N 25/702* (2023.01)
*H04N 25/53* (2023.01)
(Continued)

(52) U.S. Cl.
CPC ........... *H04N 25/702* (2023.01); *H04N 25/53* (2023.01); *H04N 25/75* (2023.01); *H04N 25/134* (2023.01)

(58) Field of Classification Search
None
See application file for complete search history.

(56) References Cited

U.S. PATENT DOCUMENTS

| | | | |
|---|---|---|---|
| 10,133,944 B2 * | 11/2018 | Zink | G06N 3/063 |
| 2016/0227135 A1 * | 8/2016 | Matolin | H04N 25/77 |

FOREIGN PATENT DOCUMENTS

| | | |
|---|---|---|
| CN | 107333040 A | 11/2017 |
| CN | 108200362 A | 6/2018 |
| WO | 2018058155 A2 | 3/2018 |

* cited by examiner

*Primary Examiner* — James M Hannett
(74) *Attorney, Agent, or Firm* — Browdy and Neimark, PLLC

(57) ABSTRACT

Embodiments of the present disclosure provide a cone-rod dual-modality neuromorphic vision sensor, including: a first preset quantity of voltage-mode active pixel sensor (APS) circuits and a second preset quantity of current-mode APS circuits, where each of the voltage-mode APS circuits includes a first-type photosensitive device, and each of the current-mode APS circuits includes a second-type photosensitive device. The voltage-mode APS can output a target voltage signal representing light intensity information in a target light signal. The obtained target voltage signal represents the light intensity information with a higher precision, and therefore an image with higher quality can be obtained, that is, the image has a higher signal-noise ratio. The voltage-mode APS can output a specified digital signal representing light intensity gradient information in the target light signal, to ensure performance indicators such as an image dynamic range and a shooting speed of the neuromorphic vision sensor, thereby making the neuromorphic vision sensor more stable and robust.

10 Claims, 3 Drawing Sheets

(51) Int. Cl.
*H04N 25/75* (2023.01)
*H04N 25/13* (2023.01)

CONE-ROD DUAL-MODALITY NEUROMORPHIC VISION SENSOR

FIELD OF TECHNOLOGY

The present disclosure relates to the technical field of integrated circuits, and in particular to a cone-rod dual-modality neuromorphic vision sensor.

BACKGROUND

With the deepening of research on the image sensor and the image processing and recognition algorithms, the neuromorphic vision sensor is increasingly important in many application fields such as industrial manufacturing, intelligent transportation, and intelligent robots.

The neuromorphic vision sensor mainly mimics the modality on the human retina. The human retina mainly includes two types of photoreceptors, namely, cone cells and rod cells, corresponding to two different modalities respectively. The cone cell is mainly sensitive to absolute light intensity information and color information, and has a high image restoration accuracy, but at a slow speed. On the contrary, the rod cell mainly perceives a change in light intensity information, at a fast speed, within a large dynamic range, but is unable to perceive absolute light intensity information and color information.

However, the neuromorphic vision sensors in the prior art each can mimic only one of the modalities on the human retina in a single perception mode, and therefore can perceive only a specific type of information. For example, the traditional camera, similar to cone cells, mainly perceives color information. The dynamic vision sensor (DVS), similar to the rod cells, mainly perceives the change of light intensity information. Further, application scenarios of the single-modal vision sensors are limited. For example, as for the neuromorphic vision sensor similar to the cone cells, although it is widely used in home entertainment electronic equipment, because such a sensor captures absolute light intensity information rather than the change in light intensity information, and in the field of industrial control, usually faces the problems such as an insufficient speed and a small dynamic range, it is difficult to apply. As for the neuromorphic vision sensor similar to rod cells, although the perception speed is fast, it is only sensitive to moving targets, which makes it difficult to capture images, or the captured images are of poor quality. Therefore, this sensor is difficult to meet the needs of entertainment electronic equipment. Moreover, because the neuromorphic vision sensor only contains a single perception mode, the neuromorphic vision sensor fails when this perception mode fails, which has great limitations on robots such as unmanned vehicles and drones that have high requirements for stability. In addition, the main indicators for evaluating the performance of the neuromorphic vision sensors are image quality, dynamic range, and shooting speed. It can be seen from the above that in the framework of the traditional neuromorphic vision sensors, the three indicators are usually mutually exclusive. For example, when the shooting speed is increased, the dynamic range of the neuromorphic vision sensor is reduced. When the image quality is improved, the shooting speed is generally reduced. It is difficult to take into account both.

Therefore, it is urgent to provide a cone-rod dual-modality neuromorphic vision sensor.

SUMMARY

To overcome or at least resolve some of the foregoing problems, embodiments of the present disclosure provide a cone-rod dual-modality neuromorphic vision sensor.

The cone-rod dual-modality neuromorphic vision sensor provided by the embodiments of the present disclosure includes a first preset quantity of voltage-mode active pixel sensor (APS) circuits and a second preset quantity of current-mode APS circuits, wherein the voltage-mode APS circuit includes a first-type photosensitive device, the first-type photosensitive device is configured to obtain a target light signal, extract a light signal of a specified frequency band from the target light signal, and convert the light signal of the specified frequency band into a first-type current signal, and the voltage-mode APS circuit is configured to output, based on the first-type current signal, a target voltage signal representing light intensity information in the target light signal; and the current-mode APS circuit includes a second-type photosensitive device, the second-type photosensitive device is configured to obtain the target light signal, and convert the target light signal into a second-type current signal, and the current-mode APS circuit is configured to output, based on the second-type current signal, a specified digital signal representing light intensity gradient information in the target light signal.

Preferably, the first-type photosensitive device includes a photo-diode (PD) and a color filter (CF) disposed on the PD.

Preferably, the voltage-mode APS circuit further includes: a current integrator (CI), a shutter, and an analog-to-digital converter (ADC);

the CI is configured to obtain a voltage analog signal of a target capacitor in the voltage-mode APS circuit;

the shutter is configured to control integration time of the CI; and the ADC is configured to convert the voltage analog signal of the target capacitor into the target voltage signal.

Preferably, the target capacitor is specifically an independent capacitor disposed in the voltage-mode APS circuit or a parasitic capacitor of the voltage-mode APS circuit.

Preferably, the current-mode APS circuit further includes: a first current amplifier, a comparator, an adder, and a digital-to-analog converter (DAC);

the second-type photosensitive device is connected to the first current amplifier, and the first current amplifier is connected to an input end of the comparator:

a third preset quantity of other second-type photosensitive devices around the second-type photosensitive device are each connected to an input end of the adder, and an output end of the adder is connected to the other input end of the comparator; and an output end of the comparator is connected to the DAC, the DAC converts an inputted specified digital signal into a specified analog signal, and outputs the specified analog signal to the first current amplifier or the adder, until the output end of the comparator outputs an event pulse signal, and the current-mode APS circuit outputs the specified digital signal.

Preferably, the current-mode APS circuit further includes: a first current amplifier, an adder, a differential circuit, and a voltage comparator:

the second-type photosensitive device is connected to the first current amplifier, and the first current amplifier is connected to the differential circuit;

a third preset quantity of other second-type photosensitive devices around the second-type photosensitive device are each connected to an input end of the adder, an output end of the adder is connected to the differential circuit, and the differential circuit is configured to perform a differential operation on an output result of the first current amplifier and an output result of the adder, to obtain a differential voltage signal; and the differential circuit is connected to the voltage comparator, and the voltage comparator is configured to output the specified digital signal according to the differential voltage signal.

Preferably, the differential circuit specifically includes: a differential sub-circuit and an integral sampling sub-circuit; and an output end of the first current amplifier and the output end of the adder are respectively connected to the differential sub-circuit, and the differential sub-circuit is configured to perform a differential operation on the output result of the first current amplifier and the output result of the adder, to obtain a differential current signal; the differential sub-circuit is connected to the integral sampling sub-circuit, and the integral sampling sub-circuit is configured to integrate and sample the differential current signal, to obtain the differential voltage signal.

Preferably, the current-mode APS circuit further includes: a second current amplifier; and the second current amplifier is connected between the second-type photosensitive device and the first current amplifier.

Preferably, all the target voltage signals and all the specified digital signals form an image.

Preferably, the cone-rod dual-modality neuromorphic vision sensor in the embodiments of the present disclosure further includes two storage units; and the two storage units are configured to store the target voltage signal and the specified digital signal respectively.

Embodiments of the present disclosure provide a cone-rod dual-modality neuromorphic vision sensor, including: a first preset quantity of voltage-mode APS circuits and a second preset quantity of current-mode APS circuits, where each of the voltage-mode APS circuits includes a first-type photosensitive device, and each of the current-mode APS circuits includes a second-type photosensitive device. The voltage-mode APS can output a target voltage signal representing light intensity information in a target light signal. The obtained target voltage signal represents the light intensity information with a higher precision, and therefore an image with higher quality can be obtained, that is, the image has a higher signal-noise ratio. In addition, the current-mode APS can output a specified digital signal representing light intensity gradient information in the target light signal. On the one hand, the specified digital signal can be obtained quickly. On the other hand, because the specified digital signal represents the light intensity gradient information, the dynamic range of an image can be improved. In this way, the dual-modality output mode of the cone-rod dual-modality neuromorphic vision sensor can be implemented, while the performance indicators such as the image quality, the dynamic range, and the shooting speed of the cone-rod dual-modality neuromorphic vision sensor can be ensured, to make the cone-rod dual-modality neuromorphic vision sensor more stable and robust, and applied to different shooting scenarios, with a wider application range.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DETAILED DESCRIPTION OF THE EMBODIMENTS

Figure 1:
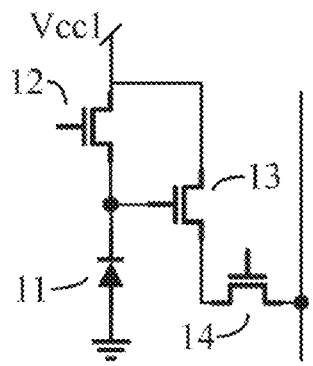
FIG. 1 is a schematic structural diagram of a voltage-mode APS circuit in a cone-rod dual-modality neuromorphic vision sensor according to an embodiment of the present disclosure.

In order to make the objectives, technical solutions and advantages of the embodiments of the present disclosure clearer, the technical solutions in the embodiments of the present disclosure are clearly and completely described below in conjunction with the drawings in the embodiments of the present disclosure. Apparently, the described embodiments are some rather than all of the embodiments of the present disclosure. On the basis of the embodiments of the present disclosure, all other embodiments acquired by those of ordinary skill in the art without making inventive efforts fall within the scope of protection of the present disclosure.

The cone-rod dual-modality neuromorphic vision sensor provided by the embodiments of the present disclosure includes a first preset quantity of voltage-mode active pixel sensor (APS) circuits and a second preset quantity of current-mode APS circuits, wherein the voltage-mode APS circuit includes a first-type photosensitive device, the first-type photosensitive device is configured to obtain a target light signal, extract a light signal of a specified frequency band from the target light signal, and convert the light signal of the specified frequency band into a first-type current signal, and the voltage-mode APS circuit is configured to output, based on the first-type current signal, a target voltage signal representing light intensity information in the target light signal; and the current-mode APS circuit includes a second-type photosensitive device, the second-type photosensitive device is configured to obtain the target light signal, and convert the target light signal into a second-type current signal, and the current-mode APS circuit is configured to output, based on the second-type current signal, a specified digital signal representing light intensity gradient information in the target light signal.

Specifically, the cone-rod dual-modality neuromorphic vision sensor provided by embodiments of the present disclosure includes a plurality of photosensitive devices. They can sense different types of light, and therefore are classified into a first preset quantity of first-type photosensitive devices and a second preset quantity of second-type photosensitive devices. The first-type photosensitive device is configured to sense the color component in the target light signal. The second-type photosensitive device is configured to directly sense the target light signal. In the embodiments of the present disclosure, the color component in the target light signal is marked as a light signal of a specified frequency band, that is, the first-type photosensitive device is configured to obtain the target light signal, extract a light signal of a specified frequency band from the target light signal, and convert the light signal of the specified frequency band into a first-type current signal. The second-type photosensitive device is configured to obtain a target light signal, and convert the target light signal into a second-type current signal. It should be noted that a sum of the first preset quantity and the second preset quantity is equal to a total quantity of photosensitive devices included in the cone-rod dual-modality neuromorphic vision sensor. The first preset quantity and the second preset quantity may be set according to a need.

The target light signal refers to the light signal reflected by the surface of the target object. The target light signal may be irradiated on the first-type photosensitive device or the second-type photosensitive device directly, through a collimating lens, or through a cover item. The wave band of the target light signal may be visible, that is, the target light signal may be a visible light signal. The target object refers to an object that is observed with human eyes, and may be a real object, an image, or another form. The specific shape of the target object is not limited in the present disclosure.

Each photosensitive device in the cone-rod dual-modality neuromorphic vision sensor provided by the embodiments of the present disclosure corresponds to a control circuit, that is, the cone-rod dual-modality neuromorphic vision sensor includes a first preset quantity of voltage-mode APS circuits and a second preset quantity of current-mode APS circuits. Each voltage-mode APS circuit includes a first-type photosensitive device. Each voltage-mode APS circuit is configured to output, based on a first-type current signal obtained through conversion by the first-type photosensitive device, a target voltage signal representing light intensity information in the target light signal. Each current-mode APS circuit includes a second-type photosensitive device. Each current-mode APS circuit is configured to output, based on a second-type current signal obtained through conversion by a second-type photosensitive device, a specified digital signal representing light intensity gradient information in the target light signal.

It should be noted that the voltage-mode APS circuit refers to an APS circuit operating under a voltage mode, that is, after obtaining the first-type current signal through conversion, the first-type photosensitive device needs to integrate it, to obtain a target voltage signal. The current-mode APS circuit refers to an APS circuit operating under a current mode, that is, after obtaining the second-type current signal through conversion, the second-type photosensitive device performs another processing on the second-type current signal instead of integrating it directly.

FIG. 1 is a schematic structural diagram of a voltage-mode APS circuit in a cone-rod dual-modality neuromorphic vision sensor according to an embodiment of the present disclosure, which is similar to the cone cells of the retina of the human eye. In FIG. 1, Vcc1 is a power supply of the voltage-mode APS circuit, and may be 3.3 V specifically. The first-type photosensitive device 11 is connected to metal-oxide-semiconductor (MOS) transistors 12 and 13, and the MOS transistor 13 is connected to a MOS transistor 14. The MOS transistor 12 is configured to perform biasing. The MOS transistor 13 is configured to switch on/off. The MOS transistor 14 is configured to perform current integration on the first-type current signal converted through conversion by the first-type photosensitive device 11 to obtain a target voltage signal, which represents the light intensity information in the target light signal.

Figure 2:
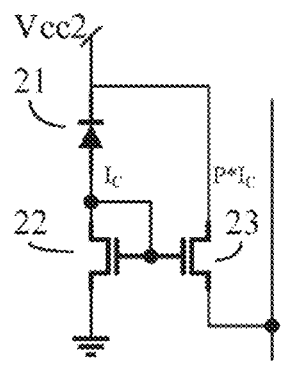
FIG. 2 is a schematic structural diagram of a current-mode APS circuit in the cone-rod dual-modality neuromorphic vision sensor according to an embodiment of the present disclosure.

FIG. 2 is a schematic structural diagram of a current-mode APS circuit in a cone-rod dual-modality neuromorphic vision sensor according to an embodiment of the present disclosure, which is similar to the rod cells of the retina of the human eye. In FIG. 2, Vcc2 is a power supply of the current-mode APS circuit, and may be 3.3 V specifically. The second-type photosensitive device 21 is connected to the MOS transistor 22. The MOS transistor 22 is connected to the MOS transistor 23 to form a current mirror. By changing the channel width of the MOS transistor 23, the current signal Ic obtained through conversion by the second-type photosensitive device 21 can be P times the size of a current signal of one end of the MOS transistor 23 corresponding to the mirror image of the second-type photosensitive device 21, that is, the current signal of one end of the MOS transistor 23 corresponding to the mirror image of the second-type photosensitive device 21 is P*Ic.

Figure 3:
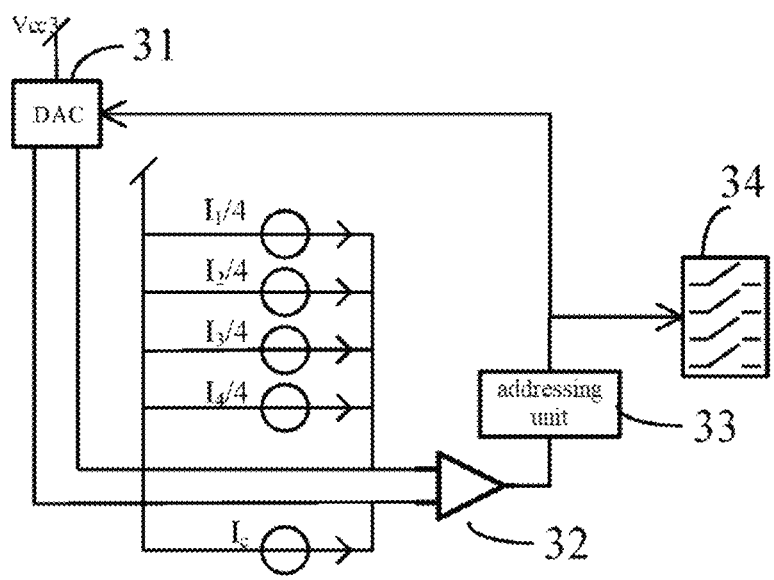
FIG. 3 is a schematic structural diagram of a circuit, in the cone-rod dual-modality neuromorphic vision sensor, configured to associate a current-mode APS circuit with another current-mode APS circuit according to an embodiment of the present disclosure.

A current-mode APS circuit is associated with another current-mode APS circuit through a circuit shown in FIG. 3. The circuits shown in FIG. 3 are similar to the retinal ganglion cells and bipolar cells of the human eye. In FIG. 3, description is made by using a second-type photosensitive device as an example. Four other second-type photosensitive devices are around this second-type photosensitive device. Vcc3 is a power supply of a circuit, and may be 3.3 V specifically. A DAC 31 is connected to a comparator 32. A second-type current signal obtained through conversion by the second-type photosensitive device is Ic. Second-type current signals obtained through conversion by four other second-type photosensitive devices around this second-type photosensitive device are I1, I2, I3, and I4 respectively, which are I1/4, I2/4, I3/4, and I4/4 after a reduction by P=4 times respectively. The comparator 32 is connected to an addressing unit 33, and the addressing unit 33 is connected to the DAC 31 and a storage unit 34. It should be noted that a specified digital signal that increases periodically may be manually inputted into the DAC 31, which may be stepped up. The addressing unit 33 is configured to address the storage unit 34 to store the output result of the current-mode APS circuit when the output end of the comparator 32 outputs an event pulse signal, that is, the comparator 32 is in an edge-triggered state. In the embodiments of the present disclosure, the comparator 32 controls the output action of the current-mode APS circuit. When the output end of the comparator 32 outputs an event pulse signal, that is, the comparator 32 is in an edge-triggered state, the current-mode APS circuit outputs a specified digital signal at this time. The specified digital signal is used for representing the light intensity gradient information in the target light signal. The storage unit 34 may specifically be a register, a latch, a static random-access memory (SRAM), a dynamic random-access memory (DRAM), a memristor, or the like. Taking the register as an example, the quantity of bits of the register is related to the precision of the DAC 31. A 4-bit register may be selected in the embodiments of the present disclosure.

Figures 4, 5, 6:
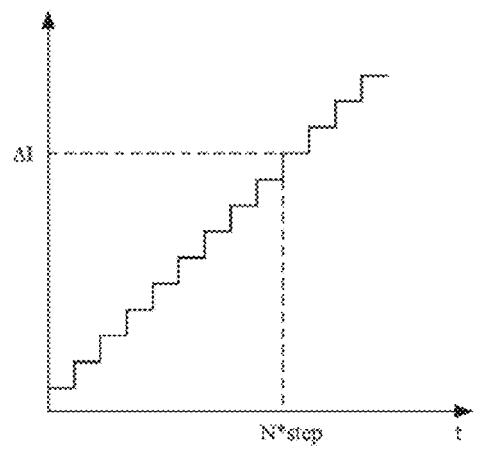
FIG. 4 is a schematic diagram of a change form of a specified digital signal, in the cone-rod dual-modality neuromorphic vision sensor, inputted from the current-mode APS circuit to a DAC according to an embodiment of the present disclosure.
FIG. 5 is a schematic structural diagram of a pixel array, in the cone-rod dual-modality neuromorphic vision sensor, corresponding to all of first-type photosensitive devices and all of second-type photosensitive devices according to an embodiment of the present disclosure.
FIG. 6 is a schematic structural diagram of a pixel array, in the cone-rod dual-modality neuromorphic vision sensor, corresponding to all of first-type photosensitive devices and all of second-type photosensitive devices according to an embodiment of the present disclosure.

The specific change form of the specified digital signal inputted to the DAC 31 is shown in FIG. 4. The specified digital signal specifically increases in a step-like manner with time. In an N*step at a moment, a value of the specified digital signal is ΔI. If the comparator 32 outputs an event pulse signal, that is, the comparator 32 is in the edge-triggered state, ΔI at this moment is used as an output of the current-mode APS circuit. N is a quantity of steps passed before, and the step is a duration during which each step is passed.

Embodiments of the present disclosure provide a cone-rod dual-modality neuromorphic vision sensor, including: a first preset quantity of voltage-mode APS circuits and a second preset quantity of current-mode APS circuits, where each of the voltage-mode APS circuits includes a first-type photosensitive device, and each of the current-mode APS circuits includes a second-type photosensitive device. The voltage-mode APS can output a target voltage signal representing light intensity information in a target light signal. The obtained target voltage signal represents the light intensity information with a higher precision, and therefore an image with higher quality can be obtained, that is, the image has a higher signal-noise ratio. In addition, the current-mode APS can output a specified digital signal representing light intensity gradient information in the target light signal. On the one hand, the specified digital signal can be obtained quickly. On the other hand, because the specified digital signal represents the light intensity gradient information, the dynamic range of an image can be improved. In this way, the dual-modality output mode of the cone-rod dual-modality neuromorphic vision sensor can be implemented, while the performance indicators such as the image quality, the dynamic range, and the shooting speed of the cone-rod dual-modality neuromorphic vision sensor can be ensured, to make the cone-rod dual-modality neuromorphic vision sensor more stable and robust, and applied to different shooting scenarios, with a wider application range.

Based on the foregoing embodiment, in the cone-rod dual-modality neuromorphic vision sensor provided by the embodiments of the present disclosure, the first-type photosensitive device includes a PD and a CF disposed on the PD.

Specifically, in the embodiments of the present disclosure, the PD and the CF disposed on the PD may form the first-type photosensitive device. An image obtained finally by the cone-rod dual-modality neuromorphic vision sensor is colorful. The CF is configured to obtain the target light signal and extract a light signal of a specified frequency band from the target light signal. The PD converts the light signal of the specified frequency band into the first-type current signal. The CF may be specifically a filter or lens configured to transmit the light signal in the specified frequency band.

When the CF is a lens, a Byron lens may be specifically selected, and other types of lenses may also be selected. The CFs can be classified into red CFs, blue CFs, and green CFs according to the wavelengths of the transmitted light signals, and the light signals transmitted by them are red light signals, blue light signals, and green light signals.

It should be noted that the first-type photosensitive device may be further formed by the PD. PDs with different response curves are selected to obtain the target light signal, extract a light signal of a specified wave band from the target light signal, and convert the light signal of the specified wave band into a first-type current signal.

Generally, a first-type photosensitive device or a second-type photosensitive device in the cone-rod dual-modality neuromorphic vision sensor corresponds to a pixel. All the first-type photosensitive devices and all the second-type photosensitive devices correspond to pixel arrays. In other others, the first-type photosensitive device and the second-type photosensitive device each correspond to the pixel one by one in the pixel arrays corresponding thereto.

In the embodiments of the present disclosure, the pixel arrays corresponding to all the first-type photosensitive devices and all the second-type photosensitive devices respectively may be shown in FIG. 5 and FIG. 6. Each grid in FIG. 5 and FIG. 6 represents a pixel. An unmarked pixel corresponds to a second-type photosensitive device in the cone-rod dual-modality neuromorphic vision sensor. A marked pixel corresponds to a first-type photosensitive device in the cone-rod dual-modality neuromorphic vision sensor. In addition, each pixel marked with a "R" corresponds to a first-type photosensitive device including a red CF. Each pixel marked with a "G" corresponds to a first-type photosensitive device including a green CF. Each pixel marked with a "B" corresponds to a first-type photosensitive device including a blue CF. In FIG. 5, pixels in four directions; up, down, left, and right of the pixel corresponding to each first-type photosensitive device each correspond to a second-type photosensitive device, and a pixel corresponding to each row of first-type photosensitive devices each including a CF filtering light with a color. In FIG. 6, pixels in eight directions: top left, top, top right, left, right, bottom left, bottom, and bottom right of the pixel corresponding to each first-type photosensitive device each correspond to a second-type photosensitive device, and a pixel corresponding to each row of first-type photosensitive devices each including a CF filtering light with three colors.

In the embodiments of the present disclosure, the pixel arrays are arranged in the manners shown in FIG. 5 and FIG. 6, to ensure the restoring of the image colors, a speed at which the images are obtained, and a dynamic range of the images.

Based on the foregoing embodiment, in the cone-rod dual-modality neuromorphic vision sensor provided by the embodiments of the present disclosure, the voltage-mode APS circuit further includes a CI, a shutter, and an ADC:

the CI is configured to obtain a voltage analog signal of a target capacitor in the voltage-mode APS circuit:

the shutter is configured to control integration time of the CI; and the ADC is configured to convert the voltage analog signal of the target capacitor into the target voltage signal.

Figure 7:
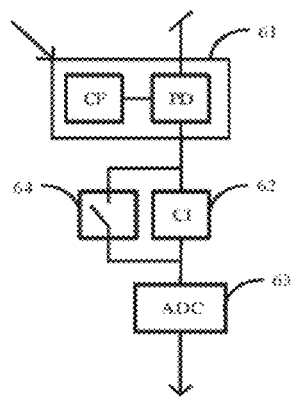
FIG. 7 is a schematic structural diagram of a voltage-mode APS circuit in the cone-rod dual-modality neuromorphic vision sensor according to an embodiment of the present disclosure.

Specifically, as shown in FIG. 7, in the cone-rod dual-modality neuromorphic vision sensor provided by the embodiments of the present disclosure, the voltage-mode APS circuit further includes not only a first-type photosensitive device 61, but also a CI 62, a shutter 64, and an ADC 63. The CI 62 is configured to obtain a voltage analog signal of a target capacitor in the voltage-mode APS circuit; and the ADC 63 is configured to convert the voltage analog signal of the target capacitor into the target voltage signal. The shutter 64 is configured to control integration time of the CI 62. For example, the shutter 64 controls the integration time of the CI 62 to be 33 ms. After 33 ms, the shutter 64 is closed, and the CI 62 obtains the voltage analog signal of the target capacitor, which is read by the ADC 63. In the embodiment of the present disclosure, a storage unit may also be connected to the ADC 63 to store the voltage analog signal of the target capacitor read by the ADC 63. The storage unit connected to the ADC 63 may specifically be a register, a latch, a SRAM, a DRAM, a memristor, or the like. Taking the register as an example, the quantity of bits of the register may be selected according to the precision of the ADC 63. An 8-bit register may be selected in the embodiment of the present disclosure to store the voltage analog signal of the target capacitor. After the ADC 63 reads, the shutter 64 may also be disconnected, and the CI 62 continues to integrate the current of the target capacitor. A video signal can be obtained by circulating the foregoing steps.

It should be noted that the circuit shown in FIG. 7 is the one in other form in FIG. 1, and they are constant essentially.

Based on the foregoing embodiment, in the cone-rod dual-modality neuromorphic vision sensor provided by the embodiments of the present disclosure, the target capacitor is specifically an independent capacitor or a parasitic capacitor disposed in the voltage-mode APS circuit.

Specifically, the target capacitor in the embodiments of the present disclosure may be a parasitic capacitor in the voltage-mode APS circuit or an independent capacitor additionally introduced into the voltage-mode APS circuit. The independent capacitor is connected to the PD in series.

In the embodiments of the present disclosure, the parasitic capacitor of the voltage-mode APS circuit is used as the target capacitor, which can save the costs of additionally introducing an independent capacitor.

Based on the foregoing embodiment, in the cone-rod dual-modality neuromorphic vision sensor provided by the embodiments of the present disclosure, the second-type photosensitive device includes a PD, that is, the second-type photosensitive device is formed by the PD without a CF and can sense a gray scale signal.

Based on the foregoing embodiment, in the cone-rod dual-modality neuromorphic vision sensor provided by the embodiments of the present disclosure, the current-mode APS circuit further includes: a first current amplifier, a comparator, an adder, and a DAC, where the second-type photosensitive device is connected to the first current amplifier, and the first current amplifier is connected to an input end of the comparator;

a third preset quantity of other second-type photosensitive devices around the second-type photosensitive device are each connected to an input end of the adder, and an output end of the adder is connected to another input end of the comparator; and an output end of the comparator is connected to the DAC, the DAC converts an inputted specified digital signal into a specified analog signal, and outputs the specified analog signal to the first current amplifier or the adder, until the output end of the comparator outputs an event pulse signal, and the current-mode APS circuit outputs the specified digital signal.

Figure 8:
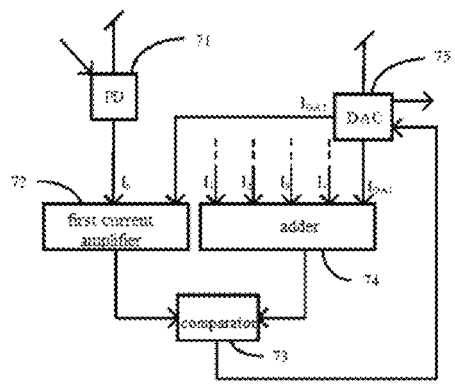
FIG. 8 is a schematic structural diagram of a current-mode APS circuit in the cone-rod dual-modality neuromorphic vision sensor according to an embodiment of the present disclosure.

Specifically, as shown in FIG. 8, the current-mode APS circuit includes a second-type photosensitive device 71. The second-type photosensitive device 71 in FIG. 8 is specifically a PD. The current-mode APS circuit further includes: a first current amplifier 72, a comparator 73, an adder 74, and a DAC 75. The second-type photosensitive device 71 is connected to a first current amplifier 72. The first current amplifier 72 is configured to amplify, a second-type current signal Ic by a third preset quantity times obtained through conversion by the second-type photosensitive device 71. In other words, a quantity of the amplifying times is equal to that of other second-type photosensitive devices around the second-type photosensitive device 71, to ensure that the amplified second-type current signal and a sum of current signals obtained through conversion by the third preset quantity of other second-type photosensitive devices around the second-type photosensitive device 71 are on a same order of magnitude. The third preset quantity corresponding to the pixel array shown in FIG. 5 is 4, and the third preset quantity corresponding to the pixel array shown in FIG. 6 is 4 or 6. In the embodiments of the present disclosure, description is made by using an example in which the third preset quantity is 4.

The first current amplifier 72 is connected to an input end of the comparator 73, to input the amplified second-type current signal into the comparator 73. Four other second-type photosensitive devices around the second-type photosensitive device 71 are each connected to an input end of the adder 74, and an output end of the adder 74 is connected to another input end of the comparator 73. Second-type current signals: I1, I2, I3, and I4 obtained through conversion by the four other second-type photosensitive devices are each inputted into the adder 74 for summation. Then, the adder inputs a sum result to the comparator 73. The comparator 73 compares the amplified second-type current signal with the sum result of the adder 74. When the compared results at a precious moment and at a current moment are constant, no outputting is performed, and the DAC 75 converts an inputted specified digital signal into a specified analog signal, and outputs the specified analog signal to the first current amplifier 72 or the adder 74. The specified analog signal outputted to the first current amplifier 72 is marked as IDA2, and the specified analog signal outputted to the adder 74 is marked as IDA1. The comparator 73 compares the specified analog signal after the outputting. When the compared results at a precious moment and at a latter moment are opposite, the output end of the comparator 73 outputs an event pulse signal, that is, the comparator 73 is in an edge-triggered state. In this case, the current-mode APS circuit outputs the specified digital signal. The specified digital signal is used for representing the light intensity gradient information in the target light signal. The specified digital signal outputted by the current-mode APS circuit is represented by using 0 and 1.

It should be noted that the adder in the embodiments of the present disclosure may be an actual device or a functional module realizing an adding function by, for example, combining lines where the second-type current signals I1, I2, I3, and I4 are located into one line. In addition, the first current amplifier may be an actual device or a functional module amplifying a current, which is not specifically limited in the embodiments of the present disclosure.

In the embodiments of the present disclosure, the DAC 75 may be connected to a storage unit, to store the specified digital signal outputted by the current-mode APS circuit. The storage unit connected to the DAC 75 may specifically be a register, a latch, a SRAM, a DRAM, a memristor, or the like. Taking the register as an example, the quantity of bits of the register may be selected according to the precision of the DAC 75. A 4-bit register may be selected in the embodiment of the present disclosure.

Based on the foregoing embodiment, in the cone-rod dual-modality neuromorphic vision sensor provided by the embodiments of the present disclosure, the current-mode APS circuit further includes: a first current amplifier, an adder, a differential circuit, and a voltage comparator, where the second-type photosensitive device is connected to the first current amplifier, and the first current amplifier is connected to the differential circuit:

a third preset quantity of another second-type photosensitive devices around the second-type photosensitive device are each connected to an input end of the adder, an output end of the adder is connected to the differential circuit, and the differential circuit is configured to perform a differential operation on an output result of the first current amplifier and an output result of the adder, to obtain a differential voltage signal; and the differential circuit is connected to the voltage comparator, and the voltage comparator is configured to output the specified digital signal according to the differential voltage signal.

Figure 9:
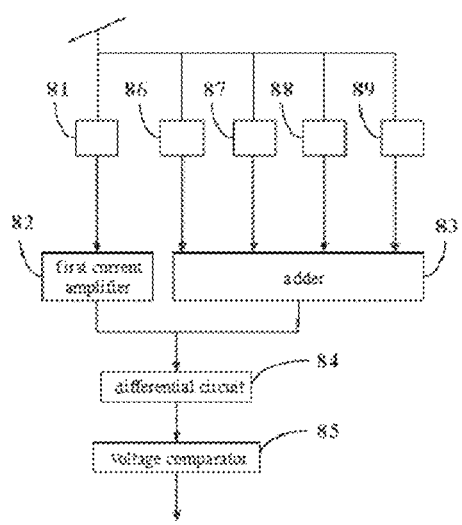
FIG. 9 is a schematic structural diagram of a current-mode APS circuit in the cone-rod dual-modality neuromorphic vision sensor according to an embodiment of the present disclosure.

Specifically, in the embodiments of the present disclosure, w % ben the specified digital signal used for representing the light intensity gradient information in the target light signal is outputted, a current-mode APS circuit shown in FIG. 9 may be also used. In FIG. 9, the current-mode APS circuit includes not only a second-type photosensitive device 81, but also a first current amplifier 82, an adder 83, a differential circuit 84, and a voltage comparator 85. The second-type photosensitive device 81 is connected to the first current amplifier 82. The first current amplifier 82 is connected to the differential circuit 84. The first current amplifier 82 is configured to amplify a second-type current signal by a third preset quantity times obtained through conversion by the second-type photosensitive device 81. In other words, a quantity of the amplifying times is equal to that of other second-type photosensitive devices around the second-type photosensitive device 81, to ensure that the amplified second-type current signal and a sum of current signals obtained through conversion by the third preset quantity of other second-type photosensitive devices around the second-type photosensitive device 81 are on a same order of magnitude. In the embodiments of the present disclosure, description is made by using an example in which the third preset quantity is 4.

Four other second-type photosensitive devices 86, 87, 88, and 89 around the second-type photosensitive device 81 are each connected to an input end of the adder 83, an output end of the adder 83 is connected to the differential circuit 84, and the differential circuit 84 is configured to perform differential operation on an output result of the first current amplifier 82 and an output result of the adder 83, to obtain a differential voltage signal. The differential circuit 84 is connected to the voltage comparator 85, and the voltage comparator 85 is configured to output the specified digital signal according to the differential voltage signal obtained by the differential circuit 84.

It should be noted that the voltage comparator is a circuit that discriminates and compares inputted differential voltage signals, and is a basic unit circuit forming a non-sine wave generating circuit. The voltage comparator that may be used in the embodiments of the present disclosure includes a single-limit comparator, a hysteresis comparator, a window comparator, a three-state voltage comparator, or the like. The voltage comparator 85 selects the differential voltage signal according to the inputted differential voltage signal. Usually, the voltage comparator is set with two thresholds. A threshold 1 is the upper threshold, and a threshold 2 is the lower threshold. Only when a pulse value of the differential voltage signal exceeds one of the two thresholds will the specified digital signal be outputted.

Based on the foregoing embodiment, in the cone-rod dual-modality neuromorphic vision sensor provided by the embodiments of the present disclosure, the differential circuit specifically includes: a differential sub-circuit and an integral sampling sub-circuit.

The output end of the first current amplifier and the output end of the adder are respectively connected to the differential sub-circuit, and the differential sub-circuit is configured to perform differential operation on the output result of the first current amplifier and the output result of the adder, to obtain a differential current signal; the differential sub-circuit is connected to the integral sampling sub-circuit, and the integral sampling sub-circuit is configured to integrate and sample the differential current signal, to obtain the differential voltage signal.

Specifically, because the voltage comparator used in the embodiments of the present disclosure compares voltage signals, the differential circuit needs to include two sub-circuits, namely, a differential sub-circuit and an integral sampling sub-circuit. The differential sub-circuit is connected to the integral sampling sub-circuit. The differential sub-circuit performs differential operation on the output result of the first current amplifier and the output result of the adder first, to obtain a differential current signal. Then, the integral sampling sub-circuit integrates and samples the differential current signal, to obtain the differential voltage signal.

Based on the foregoing embodiment, in the cone-rod dual-modality neuromorphic vision sensor in the embodiments of the present disclosure, the current-mode APS circuit further includes: a second current amplifier.

The second current amplifier is connected between the second-type photosensitive device and the first current amplifier.

Specifically, in the embodiments of the present disclosure, because the second-type current signal obtained through conversion by the second-type photosensitive device is small, even if it is amplified by the first current amplifier or calculated through summation, the signal is still small. Moreover, the precision of the device used in a subsequent operation is required to be high. Therefore, the requirement for the precision of the device used in the subsequent operation is reduced. The second current amplifier is connected between the second-type photosensitive device and the first current amplifier to preliminarily amplify the second-type current signal obtained through conversion by the second-type photosensitive device. The second current amplifier may be an actual device or a functional module amplifying a current, which is not specifically limited in the embodiments of the present disclosure.

Based on the foregoing embodiment, in the cone-rod dual-modality neuromorphic vision sensor in the embodiments of the present disclosure, all the target voltage signals and all the specified digital signals form an image.

In summary, because there is no cone-rod dual-modality neuromorphic vision sensor currently to simultaneously acquire the visual perception signals of cone cells and rod cells, embodiments of the present disclosure provide a cone-rod dual-modality neuromorphic vision sensor based on the cone cells and rod cells, to imitate human retinas, acquiring a low-speed light intensity signal (similar to cone cells) and a high-speed spatial gradient signal (similar to rod cells), which makes up for the technical gap in the related art.

Finally, it should be noted that the foregoing embodiments are used only to explain the technical solutions of the present disclosure, but are not intended to limit the present disclosure. Although the present disclosure has been described in detail with reference to the foregoing embodiments, those of ordinary skill in the art should understand that they can still modify the technical solutions described in the foregoing embodiments, or make equivalent substitutions on some technical features therein. The modifications or substitutions do not make the essence of the corresponding technical solutions deviate from the spirit and scope of the technical solutions of the embodiments of the present disclosure.

What is claimed is:

1. A cone-rod dual-modality neuromorphic vision sensor, comprising a first preset quantity of voltage-mode active pixel sensor (APS) circuits and a second preset quantity of current-mode APS circuits, wherein
the voltage-mode APS circuit comprises a first-type photosensitive device, the first-type photosensitive device is configured to obtain a target light signal, extract a light signal of a specified frequency band from the target light signal, and convert the light signal of the specified frequency band into a first-type current signal, and the voltage-mode APS circuit is configured to output, based on the first-type current signal, a target voltage signal representing light intensity information in the target light signal; and
the current-mode APS circuit comprises a second-type photosensitive device, the second-type photosensitive device is configured to obtain the target light signal, and convert the target light signal into a second-type current signal, and the current-mode APS circuit is configured to output, based on the second-type current signal, a specified digital signal representing light intensity gradient information in the target light signal.

2. The cone-rod dual-modality neuromorphic vision sensor according to claim 1, wherein the first-type photosensitive device comprises a photo-diode and a color filter disposed on the photo-diode.

3. The cone-rod dual-modality neuromorphic vision sensor according to claim 2, wherein the voltage-mode APS circuit further comprises: a current integrator (CI), a shutter, and an analog-to-digital converter (ADC);
the CI is configured to obtain a voltage analog signal of a target capacitor in the voltage-mode APS circuit;
the shutter is configured to control integration time of the CI; and
the ADC is configured to convert the voltage analog signal of the target capacitor into the target voltage signal.

4. The cone-rod dual-modality neuromorphic vision sensor according to claim 3, wherein the target capacitor is specifically an independent capacitor disposed in the voltage-mode APS circuit or a parasitic capacitor of the voltage-mode APS circuit.

5. The cone-rod dual-modality neuromorphic vision sensor according to claim 1, wherein the current-mode APS circuit further comprises: a first current amplifier, a comparator, an adder, and a digital-to-analog converter (DAC);
the second-type photosensitive device is connected to the first current amplifier, and the first current amplifier is connected to an input end of the comparator;
a third preset quantity of other second-type photosensitive devices around the second-type photosensitive device are each connected to an input end of the adder, and an output end of the adder is connected to the other input end of the comparator; and
an output end of the comparator is connected to the DAC, the DAC converts an inputted specified digital signal into a specified analog signal, and outputs the specified analog signal to the first current amplifier or the adder, until the output end of the comparator outputs an event pulse signal, and the current-mode APS circuit outputs the specified digital signal.

6. The cone-rod dual-modality neuromorphic vision sensor according to claim 1, wherein the current-mode APS circuit further comprises: a first current amplifier, an adder, a differential circuit, and a voltage comparator;
the second-type photosensitive device is connected to the first current amplifier, and the first current amplifier is connected to the differential circuit;
a third preset quantity of other second-type photosensitive devices around the second-type photosensitive device are each connected to an input end of the adder, an output end of the adder is connected to the differential circuit, and the differential circuit is configured to perform a differential operation on an output result of the first current amplifier and an output result of the adder, to obtain a differential voltage signal; and
the differential circuit is connected to the voltage comparator, and the voltage comparator is configured to output the specified digital signal according to the differential voltage signal.

7. The cone-rod dual-modality neuromorphic vision sensor according to claim 6, wherein the differential circuit specifically comprises: a differential sub-circuit and an integral sampling sub-circuit; and
an output end of the first current amplifier and the output end of the adder are respectively connected to the differential sub-circuit, and the differential sub-circuit is configured to perform a differential operation on the output result of the first current amplifier and the output result of the adder, to obtain a differential current signal; the differential sub-circuit is connected to the integral sampling sub-circuit, and the integral sampling sub-circuit is configured to integrate and sample the differential current signal, to obtain the differential voltage signal.

8. The cone-rod dual-modality neuromorphic vision sensor according to claim 5, wherein the current-mode APS circuit further comprises: a second current amplifier; and
the second current amplifier is connected between the second-type photosensitive device and the first current amplifier.

9. The cone-rod dual-modality neuromorphic vision sensor according to claim 1, wherein all the target voltage signals and all the specified digital signals form an image.

10. The cone-rod dual-modality neuromorphic vision sensor according to claim 1, further comprising two storage units, wherein
the two storage units are configured to store the target voltage signal and the specified digital signal respectively.

* * * * *